Jan. 31, 1939.     P. F. EVERITT     2,145,347
CALCULATING MECHANISM FOR MEASURING INSTRUMENTS
Filed Aug. 2, 1937     2 Sheets-Sheet 1
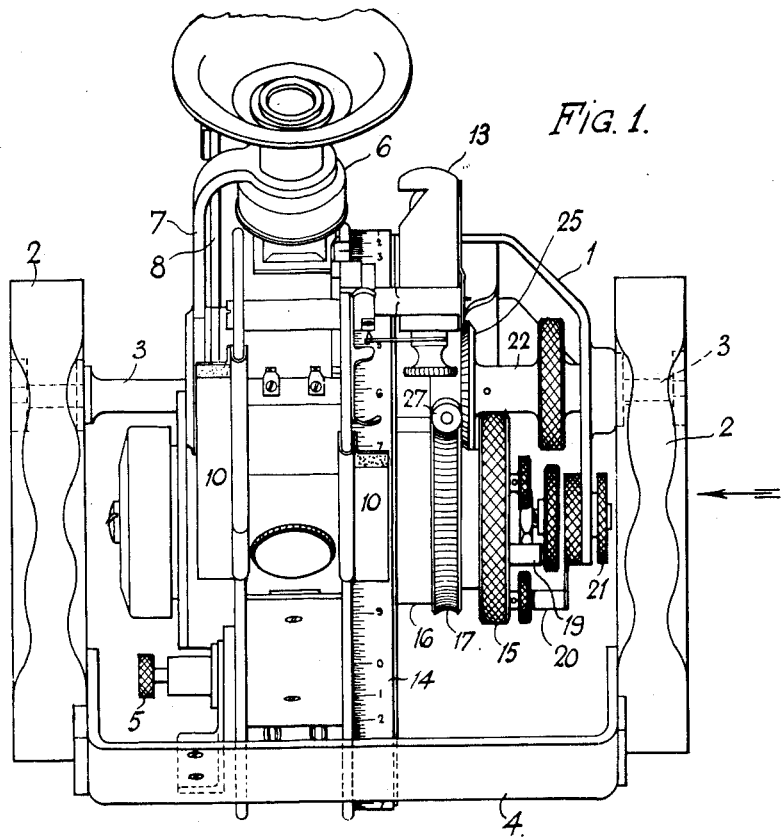
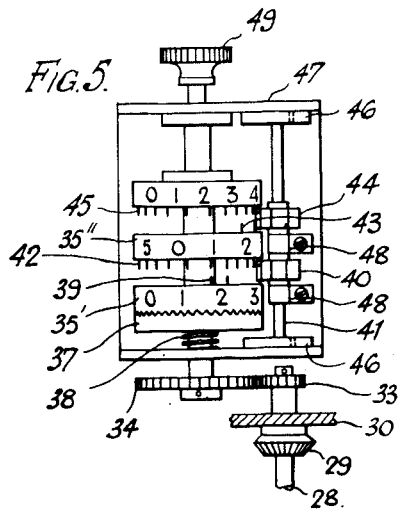
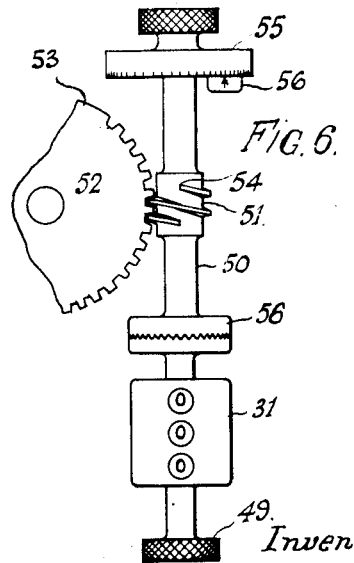
Inventor
Philip F. Everitt
by Wilkinson & Mawhinney
Attorneys.

Jan. 31, 1939.   P. F. EVERITT   2,145,347
CALCULATING MECHANISM FOR MEASURING INSTRUMENTS
Filed Aug. 2, 1937   2 Sheets-Sheet 2
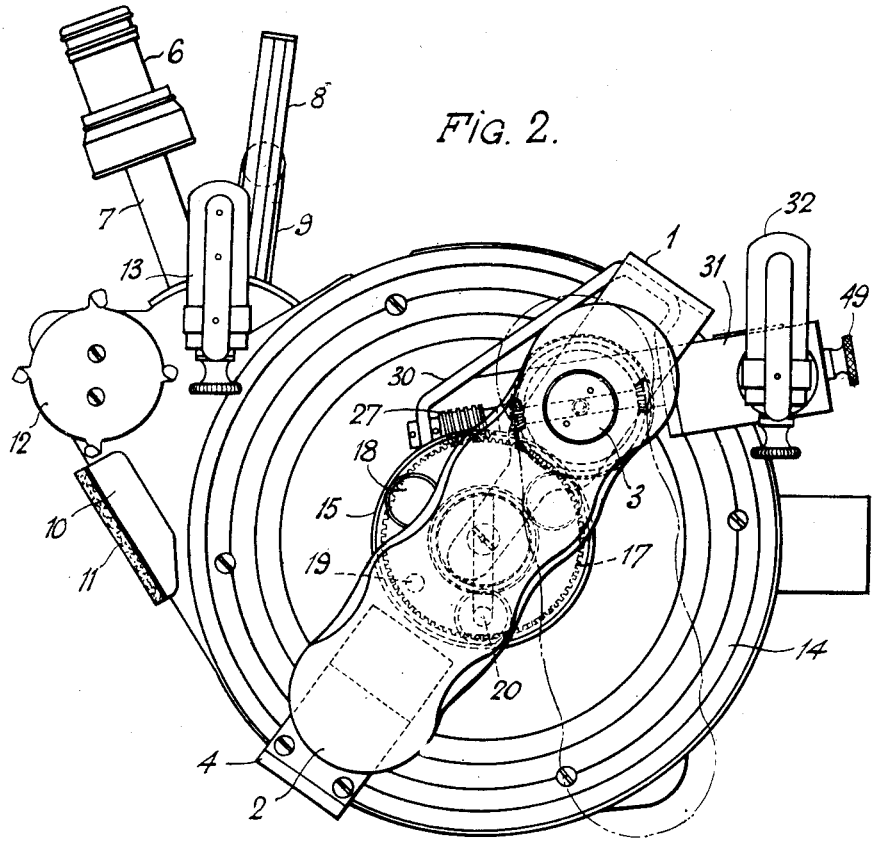
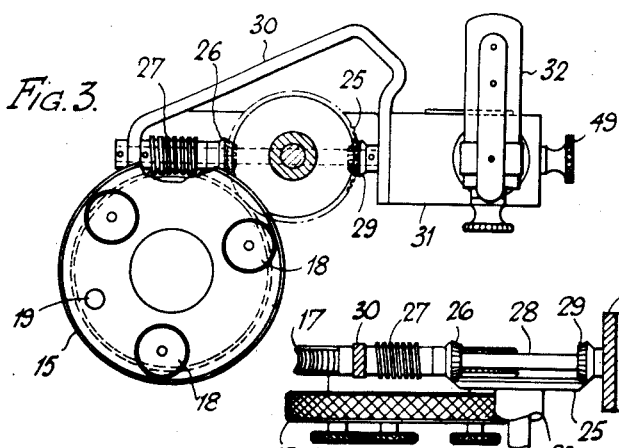
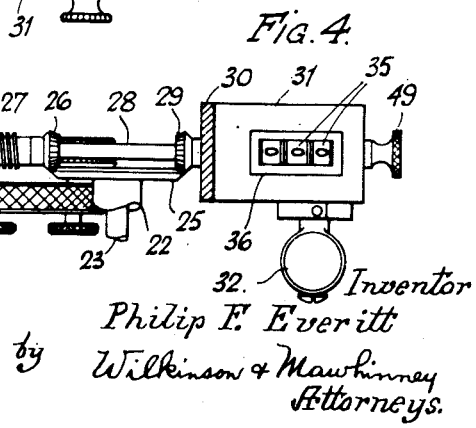
Inventor
Philip F. Everitt
by Wilkinson & Mawhinney
Attorneys.

Patented Jan. 31, 1939

2,145,347

UNITED STATES PATENT OFFICE 2,145,347

CALCULATING MECHANISM FOR MEASURING INSTRUMENTS

Philip Francis Everitt, Ilford, England, assignor to Henry Hughes & Son Limited, London, England, a corporation of Great Britain

REISSUED
SEP 29 1942

Application August 2, 1937, Serial No. 157,048
In Great Britain August 18, 1936

13 Claims. (Cl. 33—70)

This invention relates to calculating mechanism for measuring instruments and particularly to mechanism for evaluating the average value of a series of successive readings or settings of a measuring instrument.

The object of the invention is to provide simple and easily manufactured mechanism which will enable the average value of any predetermined number of readings to be instantly read off at the completion of the series of readings or settings, and a further object is to provide mechanism which can be easily and quickly pre-set to give the average of any particular number of readings in the series to be averaged.

In the arrangement according to the invention a totalizing counting mechanism is driven from, or simultaneously with, the measuring instrument through reduction gearing having a step-down ratio equivalent to the number of readings in the series to be averaged.

Thus, the member used for making the setting of a measuring instrument or indicating the reading thereof is driven through, or simultaneously with, a train of gear wheels by means of a clutch which is engaged for each setting of the instrument, but is disengaged after the setting or reading has occurred and before the instrument is returned to zero or to any convenient fixed position.

With the exception of the first gear the wheels of the gear train carry appropriate figures and thus form a totalizing counting mechanism and the successive engagements of the clutch therefore produce a summation of the different settings of readings of the instrument.

However, due to the reduction ratio of the gearing through which the totalizing mechanism is driven, the indication given by the totalizer is not the sum total of the readings of the measuring instrument but is the sum total divided by the number of readings, which is the average value of the series of readings.

The arrangement is particularly applicable to the averaging of a series of readings of a sextant and in one preferred construction the sextant mirror is adjustable by means of mechanism driven through either a coarse adjustment or a fine adjustment which can be coupled to the sextant drive by means of a clutch, and the totalizing device is driven from the fine adjustment. An adjustable stop is provided which can be set to provide a convenient reference point to which the sextant mechanism is returned after each reading, and the fine adjustment is then coupled up and used to move the sextant mirror forward to the exact position and then uncoupled to allow the sextant to be moved back to the stop ready for the following readings. As the totalizer is driven from the fine adjustment mechanism during each forward movement from the reference point or stop, the totalizer shows only the average of these small additional movements and the correct average reading is obtained by adding on the scale reading which represents the reference point.

Instead of driving the totalizer only during the forward movement from the reference point or stop, the drive to the totalizer may be arranged so that the totalizer is not driven during the movement forward from the stop but is driven only during the movement back to the stop from the actual reading position. This will likewise give an average reading of the extra distance from the stop to the actual readings.

The totalizer is provided with a resetting knob by means of which the totalizer mechanism can be returned to zero before the beginning of the next set of readings to be averaged.

The resetting mechanism can be combined with the clutch control mechanism so that either of these mechanisms can be actuated by alternative movements of the same member. For example it can be arranged that pressing in or pulling out a knob declutches the totalizer, while revolving the knob will reset the totalizer. These two motions can be made separately controllable by the use of stops, splines or other suitable means.

In an alternative arrangement, in which the sextant is provided with a micrometer screw gear having a divided head, the totalizer is driven directly from the shaft carrying the micrometer head and, the reduction ratio necessary for the totalizer to show an average reading is obtained from the micrometer gear and the relationship between the scale divisions engraved on the totalizer wheels and the micrometer head. In this construction the stop forming the reference point may be part of the micrometer gear.

The accompanying drawings illustrate the invention applied to a sextant. In the drawings,
Fig. 1 is an elevation of the sextant.
Fig. 2 is a side view looking in the direction of the arrow in Fig. 1,
Figs. 3 and 4 are detail views,
Fig. 5 is a detail view of the totalizing mechanism.
Fig. 6 illustrates the averaging device on a sextant having a micrometer screw gear.

The sextant includes a frame 1 on which the various parts are supported and the frame is provided on each side with handles 2 which can be pivoted about axis pins 3 to occupy either the position shown in full lines in Fig. 2, or the position shown in dotted lines. At their lower ends the handles 2 are joined by a bridge piece 4, and are retained in either of their alternative positions by a spring pressed retaining stud 5. The frame 1 also carries the auxiliary telescope 6 which is mounted on an arm 7 pivoted on the frame 1 and has associated with it three adjustable shades indicated at 8 which are hinged on an arm 9 pivoted on the frame 1 co-axially with the arm 8. The frame 1 also has clipped on it a forehead shield 10 for use when taking star observations and the shield 10 is faced with a layer 11 of rubber or other soft material. A watch holder 12 and electric lamp 13 for illumination are also provided.

The sextant mirror is turned by mechanism (not shown) consisting of a lever engaging a spiral groove in the face of a disc or drum which carries an ivorine scale 14 from which the observations are read. The mechanism is so designed that the scale 14 is evenly divided.

The coarse adjustment or quick motion of the sextant can be effected by turning the knurled wheel 15 which is secured to a boss 16 on the drum carrying the scale 14. Mounted on the boss 16 is a worm wheel 17 which can be clamped to the scale drum by rotation of any one of a number of clamping knobs 18 carried on the quick motion wheel 15. This wheel 15 has projecting from it a pin 19 which engages a stop 20 carried by the frame 1 and adjustable in position by release of a clamping nut 21.

The fine adjustment or slow motion mechanism (see also Figs. 3 and 4) consist of a sleeve 22, rotatable on a spindle 23, and integral at one end with a knurled disc 24 and at the other with a bevel gear 25 which meshes with a bevel pinion 26 which rotates a worm 27 engaging with the worm wheel 17. The bevel pinion 26 and the worm wheel 27 are secured on a shaft 28 which also carries a second loose bevel pinion 29 meshing with the bevel gear 25 and acting as an additional support for the bevel gear. The shaft 28 is supported in a bracket 30 which also carries the totalizing counter device 31 and an additional lamp 32 for illuminating the reading of the counter 31 and the scale 14.

The counting mechanism is driven from the shaft 28 through spur gears 33, 34 (Fig. 5) which have a reduction ratio such that the reading of the counter is reduced in proportion to the number of readings to be averaged and therefore shows the average reading directly.

The counting device has indicating drums 35 which bear numerals on their peripheries, the numerals being visible through a window 36. The indications given by the drums 35 are in degrees and minutes and accordingly one of the end indicating drums 35 is marked on its periphery with the numerals 0 to 9 to indicate the units of minutes, the middle drum is marked with the numerals 0 to 5 to indicate tens of minutes, while the other end drum is marked with the numerals 0 to 9 to indicate degrees. The drums are driven in such a manner that when the minute units drum completes a revolution the tens of minutes drum is stepped forward from one numeral to the next, while as the latter drum completes its revolution, the drum marked to show degrees is stepped forward to show the next numeral. The mechanism for producing this motion may be of any suitable form, but one preferred arrangement is illustrated in Fig. 5 which shows the gear 34 driving a toothed coupling or contrite wheel 37 pressed by a spring 38 into engagement with the first drum 35' which has projecting from one face a pair of pins 39 which engage with a toothed wheel 40 each time the drum 35' completes a revolution. The wheel 40 is freely rotatable on a spindle 41 and the teeth of wheel 40 also engage pins 42 projecting from the second drums 35" so that this drum is stepped forward from one numeral to the next each time an impulse is given to the toothed wheel 40 by the drum 35'. The drum 35" also has projecting from it a pair of pins 43 which engage, each time the drum 35" completes its total indication, with a second toothed wheel 44 also freely rotatable on spindle 41 and an impulse is thereby given to the wheel 44 to move the third drum on from one figure to the next through the pins 45 projecting from this drum and engaging with the wheel 44. The spindle 41 is supported in end plates 46 which are pivoted on the frame 47 carrying the counting mechanism and the wheels 40 and 44 are held in engagement with the pins on the indicating drums by blade springs 48 pressing on the spindle 41, so that the wheels 40 and 44 do not prevent the quick resetting of the mechanism to zero indication by means of the resetting knob 49.

The operation of the device is as follows. An approximate altitude reading is taken by the sextant using the coarse adjustment with the fine adjustment uncoupled, and the sextant mirror and scale drum are then turned back to any convenient scale reading below the minimum altitude so that this scale reading can form a reference point above which all the readings are taken, and it is not then necessary to return the instrument to zero before each reading. While the instrument is still set to the reference point, the stop 20 is released by turning the clamping nut 21 and then brought against the pin 19 projecting from the coarse adjustment knob 15 and the stop 20 is locked in its new position by tightening the nut 21. The sextant can thus be brought back to the same reference point after each reading by bringing the pin 19 against the stop 20. With the sextant in this position, the first reading is taken by connecting up the fine adjustment mechanism and using this to adjust the sextant to the exact reading. The fine adjustment is then disconnected and the sextant returned to the reference point and another reading taken by reconnecting the fine adjustment. This process is repeated for the predetermined number of readings and it will be clear that each time the sextant is turned forward from the reference point by means of the fine adjustment the counting mechanism is moved forward through an appropriate fraction of each reading by reason of the reduction ratio of the gearing connecting the counter with the sextant drive. For example if a set of six successive readings are to be taken the counter is arranged to indicate only one-sixth of each additional movement forward from the reference point so that after the last of the six readings the counter shows the average of the six additional movements beyond the reference point and it is only necessary to add on to this average reading the angular reading corresponding to the position of the stop (i. e., the reference point) to obtain the complete average of the series of measurements.

The same considerations will apply if the totalizer drive is modified so that the totalizer is driven only during the return movement of the sextant from the reading to the stop, and the totalizer markings and the drive to the totalizer may be modified so that the totalizer is inoperative each time the sextant is moved forward from the reference point but is driven by the sextant as the latter is turned back from a reading to the fixed reference point.

This arrangement whereby only the movements forward from, or back to, the reference point are averaged enables a smaller and more compact totalizing mechanism to be used and the possibility of errors occurring due to wear or slight imperfections in construction is greatly reduced.

The averaging device above described can be applied to any measuring instrument which incorporates a suitable drive and the device can be arranged to show the average value of any predetermined number of measurements by suitably altering the reduction ratio of the gearing through which the counting mechanism is driven.

If changes in the predetermined number of observations to be averaged are required the totalizer drive has multiple gear ratios obtained either by the use of separate gears or by the use of adjustable gearing, for example, of the epicyclic type.

In the arrangement shown in Fig. 6 the sextant is provided with a micrometer screw gear coupled directly to the totalizer. A shaft 50 has secured on it a worm 51 which engages with a worm wheel 52 having any convenient number of teeth terminating in a blank portion 53. The worm thread has square ends 54 which engage the blank part 53 which thus acts as the stop or reference point. The shaft 50 carries at one end a divided head 55 associated with a fixed index 56 and the other end of the shaft 50 is coupled directly through a toothed clutch 56, to the first drum of the totalizer 31. The totalizer is provided with a resetting knob 49 which is arranged so that outward endwise movement of it disengages the clutch 56, whereupon rotation of the knob 49 resets the totalizer. Pushing in the knob, of course, engages the clutch.

One revolution of the divided head is equal to a sextant movement of one degree or 60 minutes whereas the first drum of the totalizer is marked so that one revolution thereof shows 10 minutes. There is thus obtained from this relationship an effective reduction of 6 to 1 so that the totalizer will indicate directly the average value of six rotations of the divided head.

If desired, the stop member may be incorporated as part of the micrometer or averaging gear.

The average value of a number of readings can obviously be obtained, if desired, by a combination of the methods utilized in the two alternative arrangements above described, namely, by a combination of reduction by mechanical gearing in the drive to the totalizing counting mechanism with a reduction obtained by suitable marking of the totalizer scale in relation to the instrument scale. For example, the mechanical gear might give a 2 to 1 reduction while the relation between the sextant scale and the counter reading might give a 3 to 1 reduction resulting in a total reduction of 6 to 1 for giving directly the average of six readings. The average value of any other predetermined number of readings can be obtained in the same way.

What I claim as my invention and desire to secure by Letters Patent is:

1. A measuring instrument having a totalizing counting mechanism driven from, or simultaneously with, the measuring instrument through gearing giving a reduction ratio equal to the reciprocal of a predetermined number of measurements to be averaged, whereby the counting mechanism indicates directly the average value of the measurements after the predetermined number of measurements has been made.

2. A measuring instrument having a stop constituting a reference point, a totalizing mechanism, and means operative only when the instrument is moved forward from said reference point to a reading for driving said totalizing mechanism at a reduction ratio equal to the reciprocal of a predetermined number of measurements to be averaged.

3. A measuring instrument having a stop constituting a reference point, a totalizing mechanism, and means operative only when the instrument is moved back to said reference point from a reading for driving said totalizing mechanism at a reduction ratio equal to the reciprocal of a predetermined number of measurements to be averaged.

4. A sextant having a totalizing counting mechanism driven through gearing giving a reduction ratio equal to the reciprocal of a predetermined number of measurements to be averaged, an adjustable stop which can be set to prevent the sextant from being turned back beyond a predetermined position which constitutes a reference point, a slow motion drive constantly coupled to said reduction gearing, and means for coupling the slow motion drive to the sextant for moving the latter forward from the reference point and uncoupling the slow motion drive from the sextant when the latter is moved back to the reference point.

5. A sextant having a totalizing counting mechanism driven through gearing giving a reduction ratio equal to the reciprocal of a predetermined number of measurements to be averaged, an adjustable stop which can be set to prevent the sextant from being turned back beyond a predetermined position which constitutes a reference point, and means for uncoupling said reduction gearing from the sextant during the movement of the latter from the reference point and coupling the gearing to the sextant during its movement from the sextant reading back to the reference point.

6. A measuring instrument having a totalizing counting mechanism driven from, or simultaneously with, the measuring instrument through gearing giving a reduction ratio equal to the reciprocal of a predetermined number of measurements to be averaged, whereby the counting mechanism indicates directly the average value of the measurements after the predetermined number of measurements has been made, and means for altering the reduction ratio of the drive to the counting mechanism whereby the averages of different predetermined numbers of measurements can be obtained.

7. An instrument, such as a sextant, having a micrometer screw adjustment and a totalizing counting mechanism driven therefrom and arranged to show a reading proportional to that of the sextant and micrometer head in inverse ratio to a predetermined number of readings to be averaged, whereby the counting mechanism indicates directly the average value of the readings after the predetermined number of readings has been made.

8. A measuring instrument, such as a sextant, having a totalizing counting mechanism arranged to indicate directly the average value of a predetermined number of measurements, after that number of measurements has been completed, the indication of the average value being obtained by a combination of reduction drive to the counter and a scale reduction of the counter relative to the instrument scale, so that the increase in the counter reading due to each measurement is reduced proportionately to the number of measurements to be averaged.

9. In a sextant, a slow motion drive including a shaft having secured thereon a worm engaging a worm wheel freely rotatable on a spindle carrying the sextant mechanism and scale but capable of being clamped thereto by a clutch incorporating a quick adjustment knob for the sextant, a pinion on said worm shaft engaging a larger gear wheel giving a reduction ratio equal to the reciprocal of a predetermined number of sextant readings to be averaged, a spindle for said gear wheel, an indicating drum bearing numerals on its periphery indicative of units of minutes of arc and rotated by said gear wheel spindle, means operative on the completion of a rotation of said indicating drum to step forward a second indicating drum bearing numerals indicating tens of minutes of arc through a division from one numeral to the next, and means operative when the second indicating drum has turned through six divisions to turn a third indicating drum bearing numerals indicating degrees of arc from one numeral to the next.

10. In a sextant according to claim 9, a pin projecting from said quick adjustment knob, a stop carried by the sextant framework, and means for adjusting and securing the stop at any predetermined position in the path of said pin.

11. In a sextant according to claim 9, resetting means adapted to reurn all of said indicating drums to zero position.

12. In a sextant, a micrometer screw gear comprising a shaft having secured thereon a square ended worm engaging a worm wheel having a blank portion engaging a square end of said worm to form a stop, a divided head on one end of said shaft having sixty division markings corresponding to a sextant movement of one degree, a fixed index associated with said divided head, a clutch element secured on the other end of said shaft, a second clutch element driving a totalizing counting mechanism, a resetting knob for the totalizing mechanism adapted by longitudinal movement to engage and disengage the clutch, said totalizing mechanism including a first indicating drum bearing numerals on its periphery indicating units of minutes of arc and rotated directly by said second clutch element, means operative on the completion of a rotation of said indicating drum to step forward a second indicating drum bearing numerals indicating tens of minutes of arc through a division from one numeral to the next, and means operative when the second indicating drum has turned through six divisions to turn a third indicating drum bearing numerals indicating degrees of arc from one numeral to the next.

13. In a device for averaging a plurality of measurements, the combination of means adjustable in accordance with each measurement, mechanism for successively indicating a predetermined fractional increment of said measurement for each adjustment of said means, and an indicator actuated successively by said mechanism in accordance with said increments for indicating the arithmetical means of a predetermined number of said increments.

PHILIP FRANCIS EVERITT.